United States Patent [19]

Fohl

[11] 3,952,419

[45] Apr. 27, 1976

[54] TEMPLATE FOR USE IN INSTALLATION OF AN AUTO RADIO

[75] Inventor: Fred P. Fohl, Encino, Calif.

[73] Assignee: Kraco Industries, Compton, Calif.

[22] Filed: May 16, 1975

[21] Appl. No.: 578,325

[52] U.S. Cl. .............................................. 33/174 G
[51] Int. Cl.² ......................................... G01B 3/00
[58] Field of Search ........ 33/1 B, 1 G, 1 BB, 174 R,
33/174 B, 174 G, 174 H, 174 N, 197; 312/7
R; D56/4 R, 4 B; 325/312

[56] References Cited
UNITED STATES PATENTS

| | | | |
|---|---|---|---|
| 292,463 | 1/1884 | Bassett | 33/197 |
| 664,910 | 1/1901 | Voight | 33/197 |
| 3,266,162 | 8/1966 | Burke | 33/174 G |
| 3,381,385 | 5/1968 | Wilber | 33/174 R |
| 3,390,338 | 6/1968 | Race | 325/312 |
| 3,582,167 | 6/1971 | Lear | 312/7 R |
| 3,760,506 | 9/1973 | Tudberry | 33/1 BB |
| 3,832,785 | 9/1974 | Miller | 33/174 G |

Primary Examiner—Richard E. Aegerter
Assistant Examiner—Richard R. Stearns
Attorney, Agent, or Firm—Fulwider Patton Rieber Lee & Utecht

[57] ABSTRACT

A template for determining whether an auto radio unit can be installed in an auto dash having a dash opening of predetermined size and two shaft-receiving openings spaced on opposite sides of the dash opening. The template has a main opening corresponding in size and profile to the portion of the auto radio intended to extend through the dash and has two minor openings positioned on either side of the main opening in the same relative relation thereto that the shafts of the radio occupy with respect to the portion thereof extending through the dash opening. By placing the template against the dash with its openings aligned with the dash openings, it can be seen whether the dash openings are of sufficient size and correct positional location to receive the shafts of the radio and the portion thereof intended to extend through the dash.

1 Claim, 3 Drawing Figures

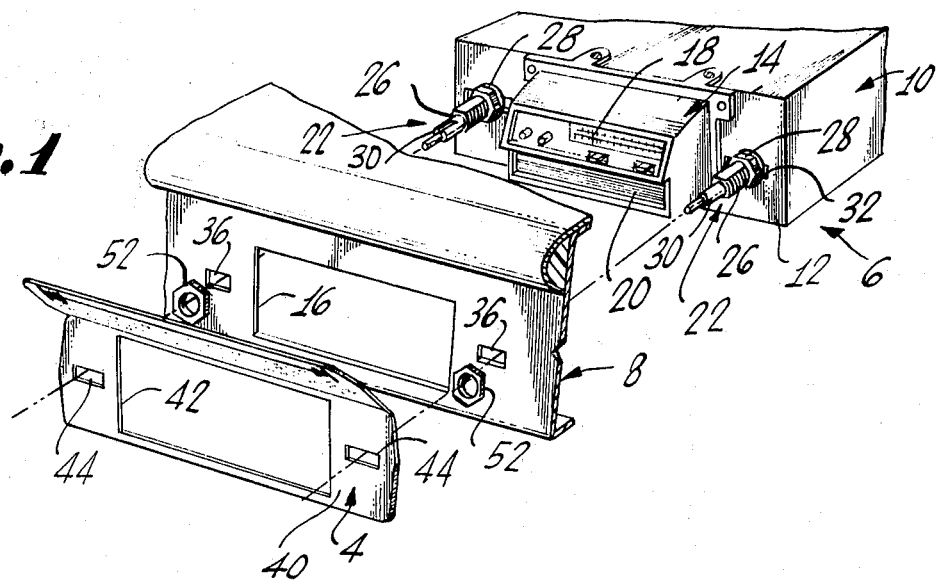
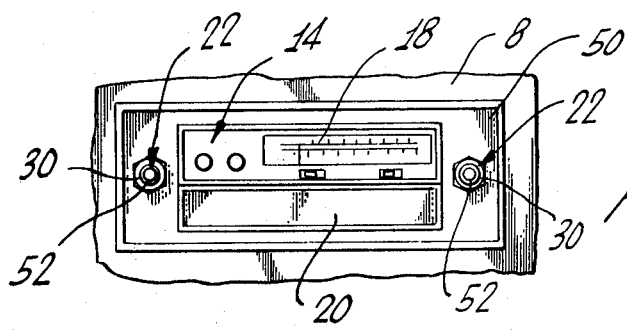
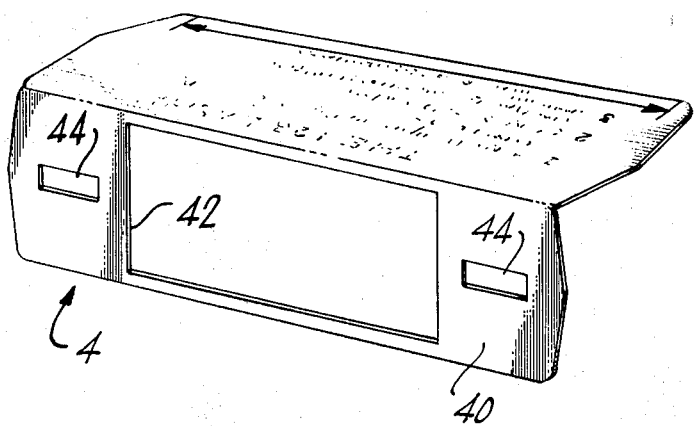

TEMPLATE FOR USE IN INSTALLATION OF AN AUTO RADIO

BACKGROUND OF THE INVENTION

This invention relates to a disposable template for determining whether the openings in an auto dash are of sufficient size and in the correct location to receive the tuning shafts of an auto radio and the portion of the radio intended to extend through the dash.

In the merchandising of auto radios, other than original equipment auto radios, it is frequently a problem for a prospective purchaser of an auto radio to determine whether the openings in the dash of his auto are of sufficient size and the correct spacing to receive the tuning shafts of the auto radio and the portion thereof intended to extend through the dash. Typically, if he is standing at a store counter or other location remote from his automobile, it will be necessary for him to measure and make sketches of the configuration of the auto radio which he intends to buy and then return to his car to make corresponding measurements. If the purchaser has an existing car radio, the burden to him of making such measurements may be sufficient to dissuade him from purchasing replacements or improved equipment, such as an auto radio combined with a cartridge stereo unit, which he might otherwise purchase.

It would therefore be a useful merchandising aid to manufacturers and sellers of auto radios to provide a simple measuring device which will enable a prospective purchaser of an auto radio to determine in an easy manner without sketches or the need to take dimensions, whether the auto radio can be installed in the existing openings in his automobile dash.

A device according to the present invention intended to enable a prospective purchaser to make the foregoing determination, comprises a specially configured template. It is a further feature of applicant's template that it can be used to determine whether the dash openings are of the requisite size and placement without requiring removal of an existing auto radio which may already be installed in the dash before the template can be used.

SUMMARY OF THE INVENTION

A template constructed in accordance with the preferred embodiment of the invention is used for determining whether an auto radio unit (or a combined auto radio/cartridge stereo unit) can be installed in an auto dash having an existing dash opening of predetermined size and two tuning shaft receiving openings spaced on opposite sides of the dash opening.

Typically, such an auto radio unit is of the type including a main housing, which is positioned behind the dash when installed, having a projecting through-dash housing which extends outwardly from the main housing and is intended to project through the dash opening. The through-dash housing would include the tuning panel and, if there is a cartridge stereo unit would also include the cartridge-receiving slot. In addition, the auto radio unit typically includes two tuning shafts extending outwardly in the same direction from the main housing on opposite sides of the through-dash housing.

The template itself comprises a generally flat sheet of self-sustaining material such as paper. A main opening extends through the sheet having a contour of at least equal size and shape to permit the through-dash housing to pass through it. Two minor openings extend through the sheet and are each adequate size to permit one of the tuning shafts to pass through. The relative location of each of the minor openings to the main opening corresponds to the location on the auto radio of the shafts relative to the through-dash housing. By aligning the openings in the sheet with the corresponding openings in the auto dash (which can be done with an existing auto radio in position) it can be determined whether the dash opening and the shaft-receiving openings in the dash are of adequate size and correct relative positional alignment to receive the through-dash housing and tuning shafts of the auto radio.

In use, a prospective purchaser inspecting an auto radio at a store counter or similar location will pick up there a paper template according to the invention, take the template out to his car and use it to determine whether the openings in his dash are of sufficient size and correct location to receive the auto radio. The template of the present invention renders this determination much easier than would be the case if the purchaser were required to take out pencil, paper and ruler in the store to measure the dimensions of the auto radio and then make a comparable measurement in his automobile. Such simplification also promotes the ease with which new auto radio units, or auto radio/cartridge stereo units, can be merchandised as replacements for existing auto radio units.

The foregoing and other advantages of the invention, are discussed further in the detailed description which follows.

BRIEF DESCRIPTION OF THE DRAWINGS

A template constructed in accordance with the preferred embodiment of the invention is illustrated in the accompanying drawings in which:

FIG. 1 is an exploded perspective view showing a portion of an automobile dash having existing openings therein, an auto radio unit for which a determination must be made whether it will fit in the dash openings, and a template according to the preferred embodiment of the invention for making such determination;

FIG. 2 is a frontal view of a portion of the dash shown in FIG. 1 showing the auto radio unit after it has been installed and a cover plate has been added;

FIG. 3 is a perspective view of a template of the type shown in FIG. 1, on an enlarged scale.

DETAILED DESCRIPTION

A template 4 (FIG. 1) according to the invention, is utilized to determine whether an auto radio unit 6 can be installed in the existing openings within an automobile dash 8.

The auto radio unit 6, as shown, is of the type comprising a generally rectangular main housing 10 having a vertical forward wall 12. Extending forwardly from the vertical wall of the main housing is a box-like projection 14 which will be referred to hereinafter as the through-dash housing. When ultimately installed, the main housing 10 of the auto radio is positioned behind the dash 8 with the through-dash housing 14 extending through a dash opening 16 in the automobile dash. The through-dash housing 14 extends in a forward direction and has a generally rectangular external profile in a plane perpendicular to the forward direction. Typically, the through-dash housing has, at its forward face, a tuning panel 18 and, in the version shown in FIG. 1, includes a slot 20 for receiving a tape cartridge. However, a template according to the invention is not confined to use with auto radios having a tape cartridge facility.

Other features of the auto radio 6 are two tuning shafts 22, for volume and for station selection, which project in a forward direction spaced on opposite sides of the through-dash housing 14. Each tuning shaft comprises an externally threaded, stationary outer cylinder 26 having a nut 28 thereon by which the cylinder is clamped against the forward end wall 12 of the main housing. Extending through each of the stationary cylinders 26 is a central, rotatable tuning rod 30 on which can be mounted a releasable knob (not shown) at the forward end. The term tuning shaft, as used herein, denotes the assembly comprising the stationary cylinder 26 and its associated tuning rod 30.

The stationary cylinders 26 pass through sidewardly elongate slots 32 in the forward end wall 12. By releasing and retightening the nuts 28 the positions of the tuning shafts 22 can be adjusted sidewardly through a limited range of adjustment to enable them to be aligned with two rectangular shaft-receiving openings 36 in the dash 8 positioned on opposite sides of the dash opening 16.

The template 4 (FIGS. 1 and 3) comprises a generally flat sheet 40 having a main opening 42 therein. In the preferred embodiment, the template is made of paper and is intended to be a disposable or throwaway item provided in a rack or otherwise at the point of sale so that a prospective purchaser can pick up a template at the point of sale and take it to his automobile and can discard it after use.

The main opening 42 in the template is of equal size and the same profile as the maximum external profile of the through-dash housing as is measured in a plane perpendicular to the forward direction in which the through-dash housing extends. Thus the template opening 42 is of at least adequate size and shape to permit the through dash housing to pass through it. As shown in FIGS. 1 and 3, both the through-dash housing 14 and the main opening 42 in the template have a rectangular profile, although other configurations, such as oval, could be envisaged. The sheet 40, in the portion thereof extending vertically above the opening 42, may be bent over at a fold line, so that a conveniently folded template can be handed out at the point of sale, although it would be unfolded in use as shown in FIG. 1.

Spaced on opposite sides of the main dash opening 42 are two rectangular, sidewardly elongate, minor openings 44 extending through the sheet. The positioning of the minor openings 44 in relation to the main opening 42 is in the same relationship as the positioning of the shaft 22 on the auto radio relative to the through-dash housing 14. Further, each of the slots 44 is of at least adequate size to permit one of the timing shafts 22 to pass through it.

In use, a prospective purchaser contemplating purchase of one of the auto radio units 6 at a location remote from his automobile, e.g., at a store counter, will pick up there one of the templates 4 and take it out to his automobile. There, he will remove the knobs from the tuning shafts of his existing radio, unfold the template and slide the openings 44 over the shafts of the existing radio. If the existing opening in his auto dash is larger than and overlaps the peripheral boundary of the main opening 42 in the template, then the prospective purchaser is shown that his dash opening is of sufficient size to receive the through-dash housing 14 of the auto radio and further that the shaft openings in the dash are appropriately positioned for the shaft 22 of the auto radio. He can then return to the store and make the purchase. The template thus provides the purchaser with a quick, easy and inexpensive method of rapidly determining whether or not the existing openings in his auto dash can receive the auto radio without requiring sketching or the measuring of dimension with a ruler.

As a further refinement, the sideward length of each of the minor openings 44 in the template is equal to the sideward range of movement of each of the tuning shafts along its associated slot 32 in the forward endwall 12 of the main housing and in corresponding relation relative to the main opening 42. Thus, the template also enables the purchaser to make a determination whether the auto radio unit is capable of sufficient adjustment in the position of the tuning shafts to bring them into alignment with the existing openings 36 in his auto dash.

After the determination whether or not the unit can be fitted into the existing dash openings has been made, the template, being a disposable item, can be discarded. After the radio unit has been installed, a suitable external cover plate 50 is placed over the shafts, and outer locking nuts 52 are threaded onto the cylinders 26 to secure the unit and cover plate to the dash 8 (FIG. 2).

Although the invention has been described with reference to the preferred embodiment, it will be understood that minor variations and changes may be made within the spirit of the invention disclosed and claimed herein.

I claim:

1. A disposable template for determining whether a combined auto radio and tape cartridge unit of predetermined external configuration can be installed in an auto dash, the dash having, a dash opening of predetermined size and two shaft receiving openings spaced on opposite sides of the dash opening; the combined auto radio unit and tape cartridge playing unit having, a main housing, a through-dash housing which extends outwardly from the main housing and is intended to pass through the dash opening, the through-dash housing including a radio tuning panel and a tape cartridge-receiving slot disposed in vertically stacked adjacent relation, two tuning shafts extending outwardly from the main housing parallel to and spaced from the through-dash housing spaced on opposite sides thereof, and adjustment structure permitting limited sideward adjustment of the spacing of each tuning shaft towards and away from the through-dash housing to enable the shafts to be aligned with the shaft receiving openings in the auto dash; the template comprising:

a generally flat sheet of paper; and a main opening through said sheet of at least adequate size and shape to permit said through-dash housing to pass through said main opening;

two minor openings through said sheet, each said minor opening being of at least adequate size to permit one of the tuning shafts of the auto radio unit to pass through, the relative locations of said minor openings in said sheet to said main opening therein corresponding to the location in the auto radio unit of the tuning shafts relative to the through-dash housing, each said minor opening in said sheet being elongate in a sideward direction relative to said main opening for a distance corresponding to the range of sideward adjustment of the corresponding one of the tuning shafts relative to the auto radio unit;

whereby when said sheet is placed against the auto dash with said openings in said sheet in alignment with the corresponding openings in the auto dash, it can be determined by visual inspection of the extent to which the openings in the dash overlap said openings in said sheet whether the dash opening and the shaft-receiving openings in the dash are of adequate size and correct placement to permit the through-dash housing and tuning shafts of the auto radio unit to pass through the dash and whether the tuning shafts of the auto radio can be adjusted sufficiently to bring them into alignment with the shaft-receiving openings in the auto dash.

* * * * *